US000001869H

United States Statutory Invention Registration [19]

[11] Reg. Number: H1,869

Beardsley et al.

[45] Published: Oct. 3, 2000

[54] VALVE TRAIN COMPONENTS HAVING AN OXIDATION AND CORROSION-RESISTANT THERMAL SPRAY COATING

[75] Inventors: Brad Beardsley, Laura; Christine K. Jones, Peoria, both of Ill.; Karen R. Raab, Neuenhain, Germany

[73] Assignee: Caterpillar Inc., Peoria, Ill.

[21] Appl. No.: 09/216,160

[22] Filed: Dec. 18, 1998

[51] Int. Cl.[7] ..... F02N 3/00

[52] U.S. Cl. ..... 123/188.3; 29/888.4; 29/888.44; 29/888.46

[56] References Cited

U.S. PATENT DOCUMENTS

| | | | |
|---|---|---|---|
| 3,508,529 | 4/1970 | Thompson | 123/188 |
| 3,649,380 | 3/1972 | Tauscher | 148/142 |
| 3,795,510 | 3/1974 | Davies et al. | 75/171 |
| 3,911,875 | 10/1975 | Ysberg | 123/41.34 |
| 4,073,474 | 2/1978 | Hashimoto et al. | 251/368 |
| 4,075,999 | 2/1978 | Danis | 123/191 A |
| 4,122,817 | 10/1978 | Matlock | 123/188 AA |
| 4,867,116 | 9/1989 | de Freitas Couto | 123/188 AA |
| 4,928,645 | 5/1990 | Berneburg et al. | 123/188 AA |
| 5,040,501 | 8/1991 | Lemelson | 123/188 AA |
| 5,076,866 | 12/1991 | Koike et al. | 148/437 |
| 5,084,113 | 1/1992 | Mori et al. | 148/127 |
| 5,249,554 | 10/1993 | Tamor et al. | 123/90.51 |
| 5,431,136 | 7/1995 | Kenmoku et al. | 123/188.3 |
| 5,495,837 | 3/1996 | Mitsuhashi et al. | 123/188.3 |
| 5,611,306 | 3/1997 | Takano | 123/188.3 |

*Primary Examiner*—Harold J. Tudor
*Attorney, Agent, or Firm*—Husch & Eppenberger

[57] ABSTRACT

Today's engines are pushed to operate at higher temperatures, higher peak cylinder pressures, in more corrosive environments and with highly variable fuel types and qualities. A solution to guttering is an oxidation and corrosion-resistant coating with a general turn MCrAlY applied to the face of the engine valve train components by thermal spray coating.

20 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VALVE TRAIN COMPONENTS HAVING AN OXIDATION AND CORROSION-RESISTANT THERMAL SPRAY COATING

TECHNICAL FIELD

This invention relates generally to the field of internal combustion engines, and more particularly to improved wear resistance of valve train components.

BACKGROUND ART

Engine exhaust valves control the intake of an air-fuel mixture and the discharge of spent gas in the combustion chamber. Each engine valve includes a valve head and a valve stem extending therefrom. The valve head is located within the combustion chamber. Cycles of tight engagement and separation are repeated between a valve seat insert snuggly fitted in a cylinder head and a contact face on the valve head. The engine valve is required to be resistant to heat, corrosion, and wear because it is exposed to elevated temperatures of 700° C. to 800° C. in a combustion chamber and subjected to repetitive collision against the valve seat insert. Furthermore, today's engines are pushed to operate at higher temperatures, higher peak cylinder pressures, more corrosive environments and highly variable fuel types and quality.

Observation of the failed valves has shown that failure appears to result from two separate and distinct modes: (i) corrosive attack that leads to guttering and (ii) radial cracking along the valve face. Guttering tends to predominate in engines burning diesel fuel; whereas radial cracking is generally observed in gas-burning engines, where engine temperatures are typically higher. Guttering in diesel engines is primarily an oxidation phenomenon along the contact face that is accelerated by the presence of deposits. These deposits, which strongly adhere to the contact face, are formed by the combustion of additives in a lubrication enhancing oil. The oxidized region is inherently brittle and erodes away during repeated cyclic loading during operation. The erosion process accelerates in an avalanche effect until engine performance degrades to the point of failure.

The root cause of radial cracking of valves in gas-burning engines appears to be related in part to the residual stresses associated with a hardfacing weldment. The higher the operating temperatures vis-à-vis diesel engines suggest that high-temperature fatigue initiating at the hardfacing/head interface could also play a role.

The wear resistance problems of engine exhaust valves described above may be addressed by hardfacing or manufacturing engine exhaust valves with a base material that is comprised of the components of the present invention. However, such alternatives would be very expensive.

The present invention is directed to overcoming one or more of the problems set forth above.

DISCLOSURE OF THE INVENTION

In accordance with the present invention there is provided a method of making an engine valve train component having a protective coating, comprising the steps of: grit blasting the face of the valve component; selecting an oxidation and corrosion-resistant coating material having the general formula MCrAlY; depositing the oxidation and corrosion-resistant coating material onto the face of the valve component; cooling the valve component during the deposition; thereafter grinding the face to finish dimensions; and thereby making an engine valve train component with an oxidation and corrosion-resistant coating on its face.

In accordance with another aspect of the invention there is provided an engine valve train component having a protective coating material including: an oxidation and corrosion-resistant, thermal spray deposited coating at the face of the valve component; and said coating having the general formula MCrAlY.

BEST MODE FOR CARRYING OUT THE INVENTION

Figure 1:
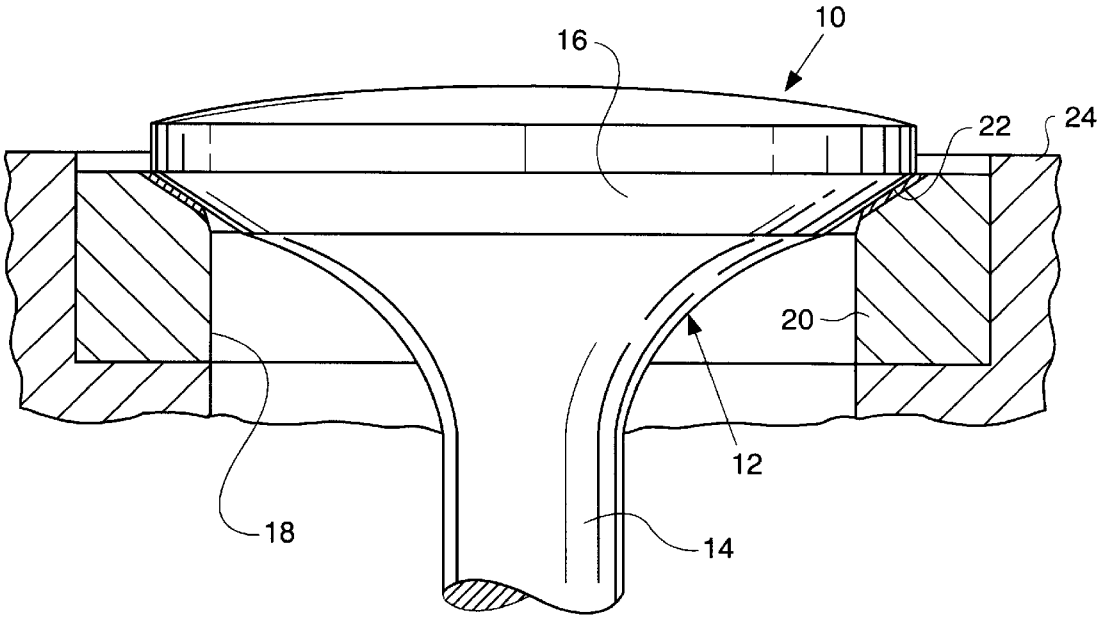
FIG. 1 is a view, partly elevational and partly sectional, of an engine valve including a valve head seated in a valve seat.
Figure 2:
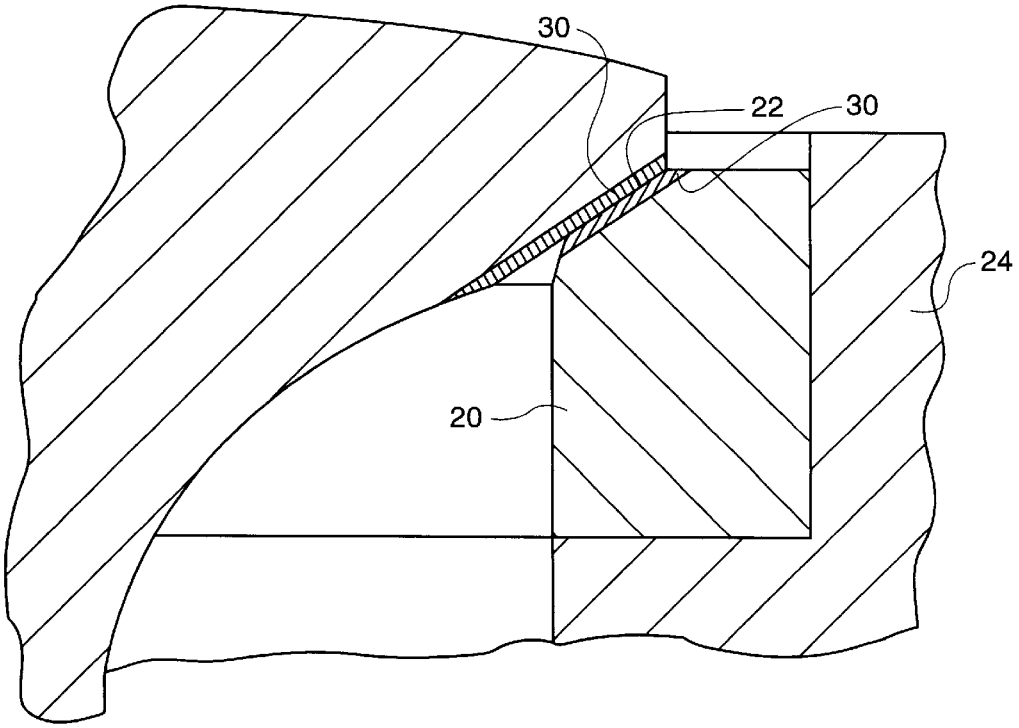
FIG. 2 is a fragmentary cross-section on a larger scale than FIG. 1 and showing the protective coating on a contact face and a valve seat face.

An engine valve, generally designated 10, includes a head 12 which has a stem 14 and a contact face 16. A valve opening 18 is formed by a valve seat insert 20 fitted into the engine block 24. The insert 20 has a valve seat face 22 against which the contact face 16 fits in gas-sealing engagement. A relatively thin protective coating 30 is on either face 16 or 22, or both.

The protective coating 30 is an oxidation and corrosion-resistant coating. This coating is thermal spray deposited via a process of: degreasing the valve component 12 or 20; grit blasting a face 16 or 22 at about 100 psi using aluminum oxide having a size less than about 1.7mm; subsequently degreasing the valve component; depositing an oxidation and corrosion-resistant coating 30 at least about 0.015" thick onto the face 16 or 22; cooling the valve component 12 or 20 during the deposition using auxiliary air; thereafter finish grinding the coating 30 of the valve component to finish dimensions with about 0.010" coating thickness.

To achieve low porosity, the deposition is by a high particle velocity spray device. One such device is generically termed High Velocity Oxygen Fuel (HVOF). This is a combustion process where oxygen is mixed with a fuel gas in a specified ratio and ignited. In this embodiment, the exhaust gas is accelerated toward a substrate using a converging/diverging nozzle, achieving velocities of 4500 ft/s. Powder metals or cermets with a particle size distribution from about 11–44 $\mu$m are injected generally axially into the gas stream, become molten and are propelled toward the contact face 16 and/or the valve seat face 22. Valve seat faces 22 are sprayed at around a 90 degree angle to a thickness of approximately 0.015–0.020". The high particle velocities contribute to the high mechanical bond strengths and high densities of HVOF coatings. During the process, the valve component 10 and/or 20 is cooled with auxiliary air, and thereafter the coating 30 is finish ground to print dimensions, with approximately 0.010" final coating thickness, as described above.

Table I indicates several applicable materials for coating 30.

TABLE I

| Material | Mftr Name | Fe | Ni | Cr | Ti | Al | C | Nb | Y | Co |
|---|---|---|---|---|---|---|---|---|---|---|
| NiCrAlY—B | Amdry 961 | — | 76.17 | 16.8 | — | 6.25 | — | — | 0.68 | — |
| NiCrAlY—A | Amdry 964 | — | 56.69 | 31.07 | — | 11.26 | 0.01 | — | 0.71 | — |
| CrC—NiCr | Diamaloy 3006 | — | 41 | 52 | — | — | 7 | — | — | — |
| CrC—NiCr | Diamalloy 3007 | — | 16 | 74 | — | — | 10 | — | — | — |
| TiAl | TiAl | — | — | 2 | 49 | 47 | — | 2 | — | — |
| FrCrAlY | | 70 | | | | 4 | | | 1 | 25 |
| CoCrAlY | | | | 18 | | 8 | | | 0.5 | 73.5 |
| NiCoCrAlY | | | 46.2 | 18 | | 12.5 | | | 0.3 | 23 |

HVOF processing parameters for Sulzer Metco HVOF equipment are included in Table II.

TABLE II

| Material | Oxygen Pressure (PSI) | Oxygen Flow Rate (SCFH) | Propylene Presure (PSI) | Propylene Flow Rate (SCFH) | Air Pressure (PSI) | Air Flow Rate (SCFH) | Nitrogen Pressure (PSI) | Powder Feed Rate (3/min) |
|---|---|---|---|---|---|---|---|---|
| CrC—NiCr | 150 | 606 | 100 | 167 | 75 | 805 | 175 | 38 |
| NiCrAlY | 150 | 577 | 100 | 167 | 75 | 631 | 175 | 70 |
| TiAl | 150 | 577 | 100 | 167 | 75 | 631 | 175 | 20 |

Table III indicates corrosion test results compared to current production valve materials.

TABLE III

| Material | Thickness of Corroded Region |
|---|---|
| Nimonic 80A | 100 $\mu$m |
| Eatonite 6 | 15 $\mu$m |
| CrC—NiCr (Diamalloy 3006) | 100 $\mu$m |
| TiAl | coating spalled during cooling |
| NiCrAlY—A | no evidence of corrosion except small localized 10 $\mu$m region |
| NiCrAlY—B | no evidence of corrosion except small localized 10 $\mu$m regions |
| CrC—NiCr | entire thickness of coating - 350 $\mu$m |

From the above results the material selected for the coating 30 has the general formula MCrAlY. In one composition the NiCrAlY-A, generally is about 76.17% by weight nickel; 16.80% by weight chromium; 6.25% by weight aluminum; and 0.68% by weight yttrium. In another composition, NiCrAlY-B generally is about 56.69% by weight nickel; 31.07% by weight chromium; 11.26% by weight aluminum; 0.01% by weight carbon; and 0.71% by weight yttrium. Of course, there may be trace elements.

Industrial Applicability

The above-described corrosion and oxidation-resistant coatings possess wear characteristics to withstand the demanding conditions present during engine operation. This precludes the guttering problem which is related to oxidation followed by micro cracking. While it is not known how guttering occurs, one possible explanation is that the exhaust gases erode the microcracks and form gas paths. Another possibility results from deposit formation on the face and subsequent spallation which removes some of the valve face material.

While preferred steps and materials have herein been described, this has been done by way of illustration and not limitation, and the invention should not be limited except as may be required by the scope of the appended claims.

What is claimed is:

1. A method of making an engine valve train component for an internal combustion engine, comprising the steps of:

grit blasting a face of the engine valve train component;

depositing an oxidation and corrosion-resistant coating material having the general form MCrAlY onto the face of the engine valve train component;

cooling the engine valve train component during the deposition;

grinding the face to finish dimensions.

2. The method of making an engine valve train component as set forth in claim 1, wherein the step of depositing includes depositing said coating material having about 17–31% by weight chromium.

3. The method of making an engine valve train as set forth in claim 1, wherein the step of depositing includes depositing said coating material having about 57–76% by weight nickel; about 17–31% by weight chromium; and the remainder aluminum, yttrium and trace elements.

4. The method of making an engine valve train component as set forth in claim 1, wherein said coating is a material generally being by weight about 16–32% Cr, 4–13% Al, 0–1% Y, 0–70% Fe, 0–77% Ni, 0–74% Co and trace elements.

5. The method of making an engine valve train component as set forth in claim 1, wherein the coating material generally being by weight about 31% Cr, 11% Al, 0.5% Y, and remainder nickel and trace elements.

6. A method of making an engine valve train component for an internal combustion engine, comprising the steps of:

grit blasting a face of the engine valve train component;

depositing an oxidation and corrosion-resistant coating material onto the face of the engine valve train component to a thickness of about 0.015";

cooling the engine valve train component during the deposition; and grinding the face to finish dimensions with about 0.010" coating thickness.

7. The method of making an engine valve train component according to claim 6, wherein said step of depositing an oxidation and corrosion-resistant coating material being depositing a material having a general form of MCrAlY.

8. The method of making an engine valve train component according to claim 6, wherein said step of depositing being depositing said coating material having about 17–31% by weight chromium.

9. The method of making an engine valve train component according to claim 6, wherein said step of depositing being depositing said coating material having about 57–76% by weight nickel; about 17–31% by weight chromium; and the remainder aluminum, yttrium and trace elements.

10. The method of making an engine valve train component according to claim 6, wherein said step of depositing said coating material having generally by weight about 17% Cr, 6% Al, 0.5% Y and remainder being Ni and trace elements.

11. The method of making an engine valve train component according to claim 6, wherein said step of depositing being depositing said coating material having generally by weight about 31% Cr, 11% Al, 0.5% Y, and remainder being Ni and trace elements.

12. The method of making an engine valve train component according to claim 6, wherein said depositing step includes applying the coating by a high velocity particle spray process.

13. The method of making an engine valve train component according to claim 12, wherein said high velocity particle spray process being a combustion process including mixing oxygen with a fuel gas stream, igniting said mixture, accelerating said mixture toward said face and injecting a powder of said coating material into said fuel gas stream.

14. The method of making an engine valve train component according to claim 13, wherein the step of injecting said powder includes injecting cermets into said fuel gas stream, said cermets becoming molten and being propelled toward said face.

15. The method of making an engine valve train component according to claim 13, wherein the step of accelerating being accelerating said mixture to a velocity of about 4500 feet per second.

16. The method of making an engine valve train component according to claim 13, wherein said powder having a particle size between about 11 $\mu$m and 44 $\mu$m.

17. An engine valve train component for an internal combustion engine comprising:

a contact face; and a coating being applied to said contact face, said coating being applied by a thermal spray process, said coating having general form MCrAlY.

18. The engine valve train component as set forth in claim 17, wherein said coating having a thickness of about 0.010".

19. The engine valve train component according to claim 17, wherein said coating having a composition by weight of about 17% Cr, 6% Al, 0.5% Y, and a remainder being Ni and trace elements.

20. The engine valve train component according to claim 17, wherein said coating having a composition by weight of about 31% Cr, 11% Al, 0.5% Y and a remainder being Ni and trace elements.

* * * * *